(12) United States Patent
Chan

(10) Patent No.: US 6,746,065 B1
(45) Date of Patent: Jun. 8, 2004

(54) ARMREST MOUNTED VIDEO DISPLAY SCREEN

(75) Inventor: Tak Chan, Monterey Park, CA (US)

(73) Assignee: VIS Racing Sports, Inc., Monterey Park, CA (US)

( * ) Notice: Subject to any disclaimer, the term of this patent is extended or adjusted under 35 U.S.C. 154(b) by 19 days.

(21) Appl. No.: 10/170,927

(22) Filed: Jun. 13, 2002

(51) Int. Cl.$^7$ .............................. B60N 2/46; B60R 11/02
(52) U.S. Cl. .................. 296/24.1; 296/37.8; 296/37.15
(58) Field of Search ............................ 296/24.1, 37.8, 296/37.14–37.16, 37.1, 153; 248/917; 312/7.2

(56) References Cited

U.S. PATENT DOCUMENTS

| | | | | |
|---|---|---|---|---|
| 4,843,477 A | * | 6/1989 | Mizutani et al. ............. 312/7.2 |
| 5,667,179 A | * | 9/1997 | Rosen ...................... 248/278.1 |
| 5,769,369 A | * | 6/1998 | Meinel ...................... 248/176.1 |
| 5,808,660 A | * | 9/1998 | Sekine et al. .................. 348/8 |
| 6,012,785 A | * | 1/2000 | Kawasaki ...................... 312/29 |
| 6,115,668 A | * | 9/2000 | Kaneko et al. ............. 701/207 |
| 6,125,030 A | * | 9/2000 | Mola et al. .................. 361/681 |
| 6,158,793 A | * | 12/2000 | Castro ........................ 296/1.1 |
| 6,256,837 B1 | * | 7/2001 | Lan et al. ...................... 16/334 |
| 6,279,977 B1 | * | 8/2001 | Chen .......................... 296/24.1 |
| 6,400,560 B1 | * | 6/2002 | Chian .......................... 361/681 |
| 6,494,527 B1 | * | 12/2002 | Bischoff ...................... 296/208 |
| 6,600,993 B1 | * | 7/2003 | Kaneko et al. ............. 701/208 |

* cited by examiner

*Primary Examiner*—D. Glenn Dayoan
*Assistant Examiner*—Greg Blankenship

(57) ABSTRACT

A video display screen is mounted in a recess or cut-out of an armrest within a vehicle. The armrest pivots up and locks in an upright position so that the display screen can be viewed by rear seat passengers, and pivots down so that the display screen can be viewed by the driver or the front seat passenger. The armrest includes a telescoping section so that the display screen can be raised or lowered as desired by the rear seat passengers. The video screen can be switched between being operatively connected to either an entertainment device such as a VCR or DVD player, or to a navigational device The display is pivotally mounted within the armrest both so that it can be tilted for optimal viewing, and so that it can be rotated 180 degrees into a screen-down position when the screen is not being used, the backside of the screen visually blending with the rest of the armrest so that the screen is protected against both theft and incidental damage when not in use.

37 Claims, 4 Drawing Sheets

ARMREST MOUNTED VIDEO DISPLAY SCREEN

CROSS-REFERENCE TO RELATED APPLICATIONS

None

BACKGROUND OF THE INVENTION

1. Field of the Invention

The present invention relates to video displays, and more particularly relates to the field of video display mounting systems for use in vehicles and the like.

2. Description of the Related Art

Video display screens have been used in vehicles such as automobiles, vans, van conversions, recreational vehicles, airplanes, trains, and the like, for providing information to the driver or entertainment to the passengers. Such video display screens can be connected to a video playback device such as a video cassette recorder (VCR) or digital video disc (DVD) player for entertainment. Video screens used with navigational systems are typically mounted on the dashboard and connected to a navigational computer for providing maps and other navigational information such as GPS data to the driver.

A number of mounting systems have been proposed to allow a display to be viewed when in use but stowed or otherwise protected when not in use. U.S. Pat. No. 5,316,369 issued to Kanda discloses a display screen mount having a hinge which allows the display screen to be folded into a cavity within the armrest when not in use. U.S. Pat. No. 5,222,780 issued to Reh et al. discloses an armrest having a plurality of telescopic trays and a screen mounted on a retractable arm and a slide track for stowing the screen into a cavity within the armrest. U.S. Pat. No. 5,374,104 issued to Moore et al. discloses a display mounted to a retractable arm that retracts into a cavity within the armrest. U.S. Pat. No. 4,982,996 issued to Vottero-Fin et al. discloses a video display that is mounted to the back wall of a lift-up armrest so that the screen can be viewed by passengers in the back seat of a vehicle. Additionally, video display screen have been mounted on the ceiling of the passenger compartment. There remains a need for a video screen that can be easily, simply, and inexpensively mounted, especially for after-market retrofitting and conversions.

SUMMARY OF THE INVENTION

The present invention provides an elegant and inexpensive solution to the problem of where and how to mount a video screen, particularly so that it can be viewed by persons in either the front seats or the rear seats, and particularly for after-market conversions. The display can be quickly deployed and then covered up again for protection against incidental damage and theft. A flat panel display screen is mounted within a matching cut-out of the driver side armrest which is often also the lid to a container in different types of vehicles. The display is rotatably mounted so that it can rotate or "flip" at least approximately 180 degrees relative to the armrest, so that with a fast and simple motion the screen can be made available for viewing by front seat passengers and returned again to a protected non-viewing or stowed position. The rear surface of the display screen is provided with a finish similar to the finish on the top surface of the armrest, so that when the display is flipped to its non-viewing position the existence of the display is not obvious to the casual observer or potential thief looking into the vehicle. The armrest is pivotally mounted so that it can be raised to an upright position and locked in that position, thus allowing rear seat passengers to view the display. The armrest may also contain a telescoping section so that the display screen can be raised even higher up for optimal viewing by passengers in the rear seat. Because the display can be viewed by either front seat or rear seat passengers, the display can be used to present either navigational information or entertainment information. Container lids which function as driver armrests in recreational vehicles and the like are often hinged at the rear. In one embodiment therefore, the display and mount can be implemented as a combination after-market lid and inlaid video screen which can be inexpensively pre-assembled in a shop or factory as a unit, and then quickly installed into a vehicle by simply replacing the stock container lid on the stock container with the combined after-market lid and display assembly. In another embodiment the stock container and lid can be quickly replaced with a pre-assembled replacement container and lid which incorporates the video screen and which matches the footprint of the stock container.

As additional features, the display can be controlled so that entertainment information may be viewed upright by passengers in the rear seat of the vehicle, and navigational information can be displayed on the screen rotated ±90 degrees in either direction for convenient viewing by either the driver or front seat passenger. The display can be mounted to rotate about an axis that is generally parallel to the armrest, and either longitudinal to the armrest or transverse to the armrest, or both. In this way the display can be tilted for improved viewing by any person within the vehicle.

The above-described objects of the present invention and other features and benefits of the present invention will become clear to those skilled in the art when read in conjunction with the following detailed description of a preferred illustrative embodiment and viewed in conjunction with the attached drawings.

BRIEF DESCRIPTION OF THE DRAWINGS

A detailed description of the preferred embodiments of the invention will be made with reference to the accompanying drawings, in which like numbers refer to like parts.

DETAILED DESCRIPTION OF THE INVENTION

In many vehicles such as vans, min-vans, van conversions, recreational vehicles, and even some smaller passenger vehicles, a container is provided between the two front seats. Depending on the size of the vehicle and the size of the container, the container may be adapted and/or used for holding coins, sunglasses, cassette tapes, and the like. A lid to the container is commonly attached to the rest of the container by a hinge attachment located toward the rear of the vehicle, so that the lid pivots upwardly to reveal the objects stored within the container. The container lid typically also functions as an armrest for the driver and/or the front seat passenger. In the following description, for convenience of discussion the invention will be described with reference to a container lid or armrest disposed between the front seats because the invention is particularly well suited for that embodiment. It will be understood, however, that various embodiments of the invention can be used in conjunction with many different types of armrests, container lids, or other types of pivoting structures that might be mounted within a vehicle. Such structures include, for example, a special pivoting arm mounted within the vehicle specifically for mounting according to the teachings of the present invention, a glove compartment lid, or the like. In the discussion and claims that follow, for convenience the term "armrest" will be used to mean both an armrest that functions as an armrest whether or not it is also a lid or cover to a container, as well as a cover or a lid to a container whether or not it is well suited or positioned for people to rest their arms thereon. The terms "container lid" or "container cover," however, will be used in their normal senses. Additionally, the term "vehicle" will be in a broad sense to encompass both automobiles and other forms of motorized transport.

Figure 1:
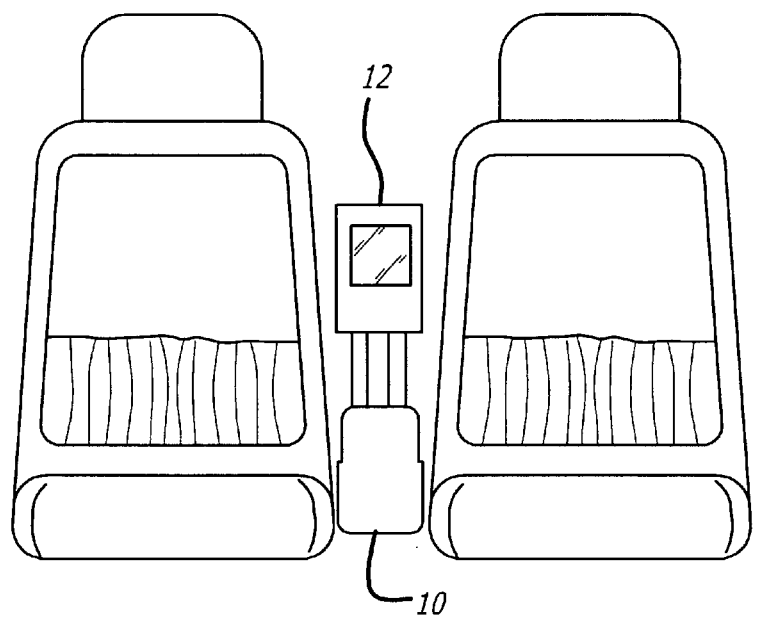
FIG. 1 is a front view of the front seat of a vehicle equipped with the video screen of the present invention, when the video screen is in its raised and extended position.
Figure 2:
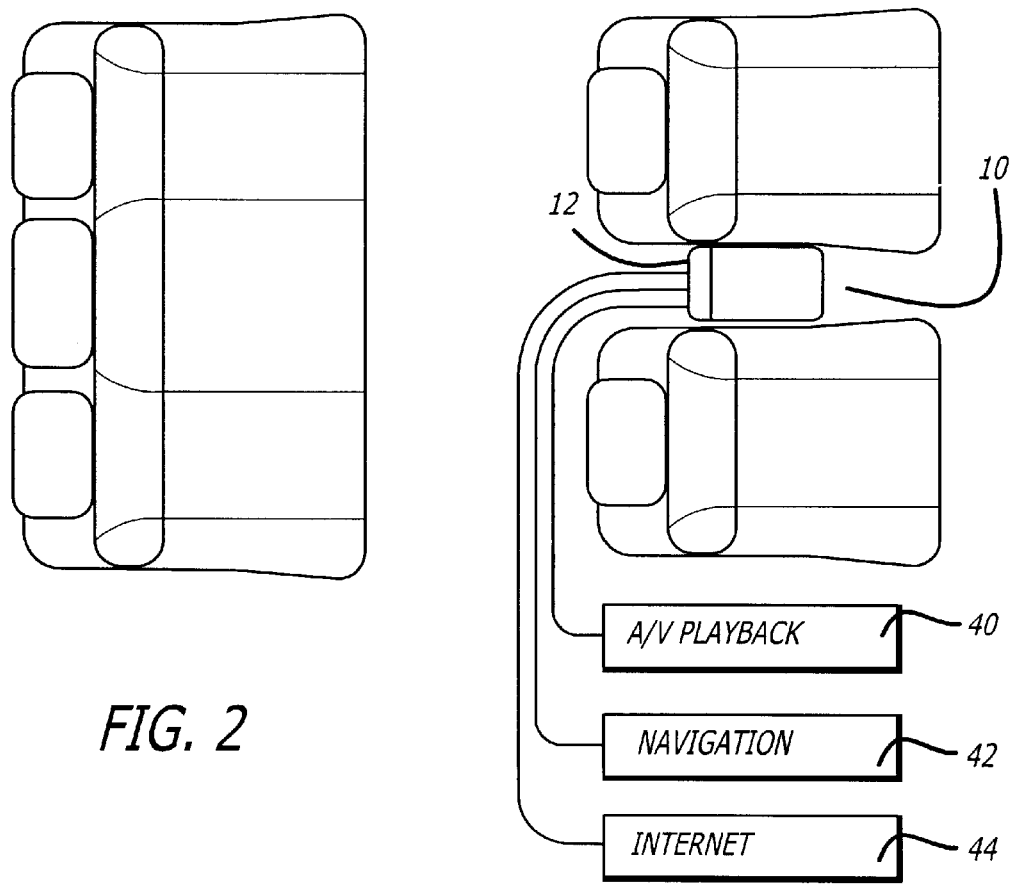
FIG. 2 is a top view showing the position of the video screen within a vehicle.

FIG. 1 shows the front seat of a vehicle with a container 10 and an armrest 12 covering the container, with a video screen mounted in the armrest. FIG. 2 shows the position of the container 10 and armrest 12 in an exemplary vehicle. When the armrest is raised to a substantially vertical position, the video screen is also raised so that it can be viewed by passengers in the rear seat. More generally, the video screen can be viewed by at least a first person in a first location when the armrest is in its lowered position, and may be viewed by a second person in a second location when the armrest is in its raised position.

Figure 3:
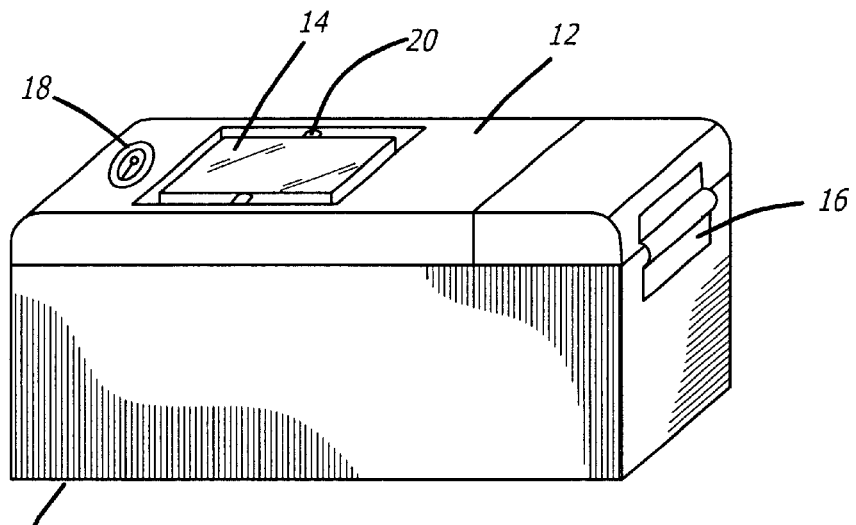
FIG. 3 is a perspective view of the container/armrest with a video screen mounted in the lid/armrest according to the present invention, with the container lid in the closed position.

FIG. 3 shows just the container 10, with the video display screen 14 mounted into a cut-out region or aperture of the body of armrest 12. Display screen 14 is preferably a flat panel display such as a color liquid crystal display (LCD) panel. Armrest 12 is mounted to the body of the container by a hinge 16 at the rear of the container. The container may be locked closed via a security lock, such as key lock 18. A pair of pivots 20 holds the display within the cut-out region of the armrest. The operation of the pivots is shown more clearly in FIG. 4.

Figure 4:
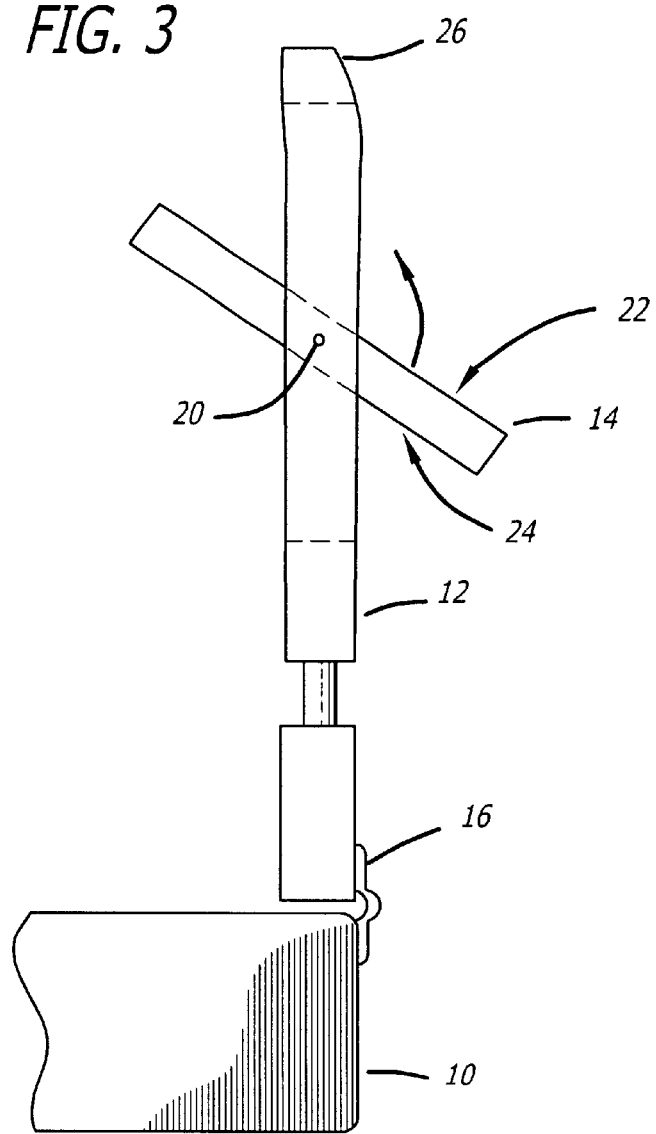
FIG. 4 is a side elevation view of the video screen in the raised position and illustrating the rotation of the video screen within the container lid/armrest.

FIG. 4 shows the armrest in its raised and substantially vertical position, with display 14 being pivoted or rotated about the two pivots 20. The front or viewing side 22 of the display contains the display screen itself. The backside or non-viewing side 24 of the display has a contour and finish that matches the finish on the top surface of the armrest, so that when the display is rotated so that the display screen faces inward toward the container cavity, i.e., the display screen is in its non-viewing position, the outward facing non-viewing side 24 visually blends with the rest of the top surface 26 of armrest 12. This makes the existence of display 14 within armrest 12 more difficult to detect to a casual observer or potential thief, thus providing some measure of protection against theft when the display is in its non-viewing position and the armrest is in its lowered position.

In that position the display screen and any associated controls are also protected against incidental damage. The display may be mechanically locked or tightened so that it stays in the rotational position it is placed in, or so that it will only rotate when torque is intentionally applied to deliberately rotate the device. Display 14 may also be locked in the non-viewing position by a mechanical lock such as a latch operated by a mechanical release accessible from the underside of the armrest or by a security lock so that it cannot be rotated from that position, thus providing a measure of security against theft when the armrest is down and locked in that position to the body of the container by operation of key lock 18.

Alternatively, the display could be rigidly mounted within the armrest, and covered up by a cover which slides out from within the armrest and over the display. Still further, a separate display cover could be provided that mechanically engages the armrest. As a security feature, the separate cover could be released only by operating a release mechanism located on the underside of the armrest, which itself can be locked in the down position via key lock 18.

As shown in the figure, the display is pivotally mounted so as to rotate about an axis that is substantially parallel to the plane of the armrest's upper surface and is transverse to the vehicle. This allows passengers in the rear seat to tilt the display either up or down for easier viewing. Alternatively, the display could be pivotally mounted so as to rotate about an axis that is longitudinal to the vehicle. In that way, when the armrest is down and the display is in its viewing position the display could be tilted up or down for best viewing by the driver, or could be tilted for best viewing by the passenger. Still further, the display could be fully gimbaled so as to pivot about both the longitudinal and the transverse axes so as to accommodate any viewing angle. The display is said to be substantially parallel to the plane of the armrest's upper surface because the armrest is often curved and therefore does not define an exact plane, and some offset from the nominal plane would still be within the scope of the invention.

As can be seen in the figure, screen 14 easily rotates or "flips" about pivots 20 without the screen being spacially displaced during such rotation. When armrest 12 is in its down position, flipping screen 14 through approximately 180 degrees of rotation changes the screen from presenting viewing side 22 to the viewer, to presenting non-viewing side 24 to the viewer. Thus, when the armrest is in its down position, the viewer can easily change the screen from its stored position to its viewing position simply by flipping the screen through approximately 180 degrees or a half turn about a substantially horizontal axis in place. By allowing the screen to be flipped 180 degrees in place, the current invention eliminates the need for a viewer to operate an articulating arm as with certain prior art devices, or otherwise substantially spacially displacing the screen in order to stow or deploy the screen.

Figure 5:
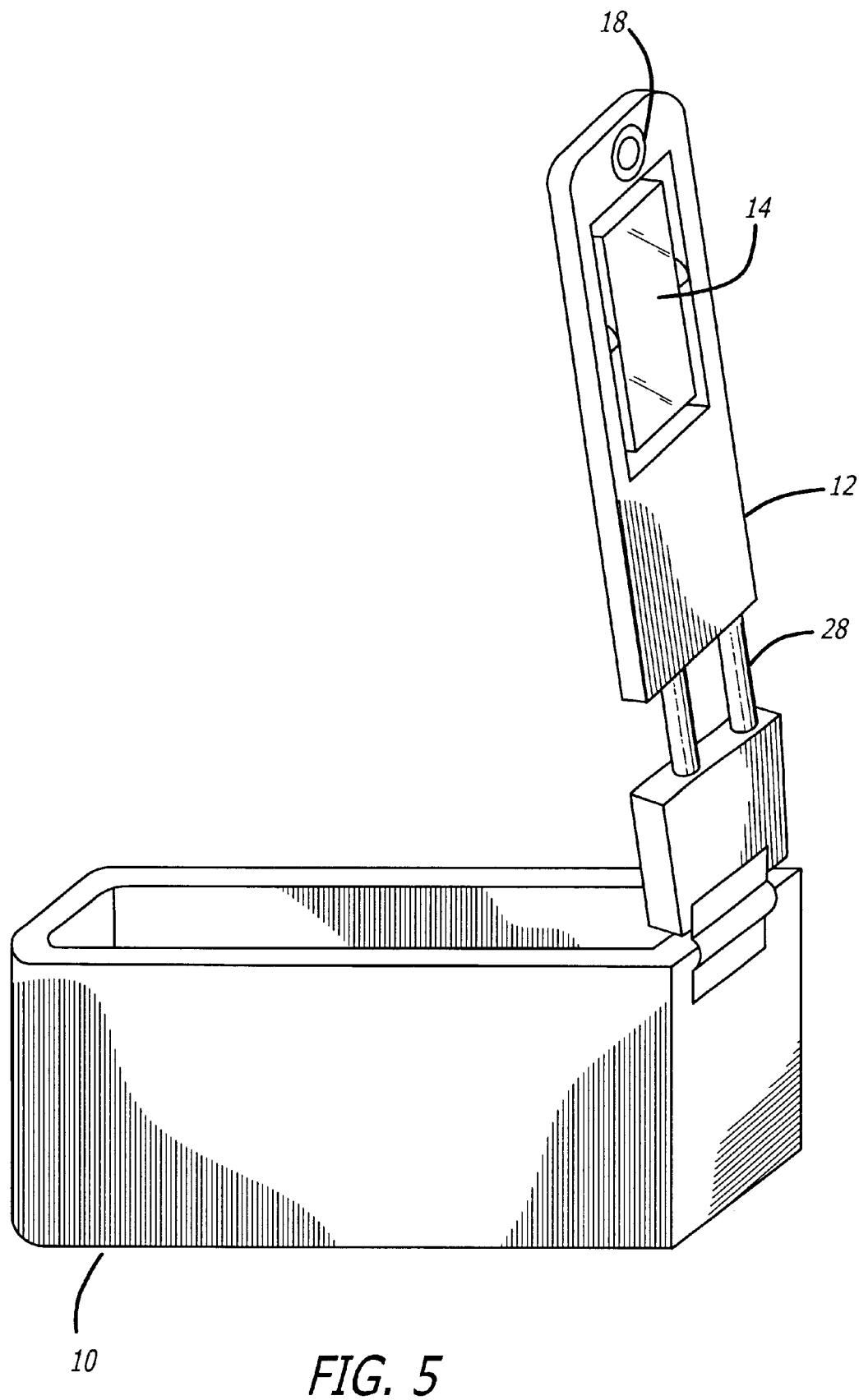
FIG. 5 is a perspective view showing a container with the video screen mounted into the armrest/lid of the container, with the video screen in the raised position.

FIG. 5 shows the container and armrest with the armrest 12 raised to a nearly vertical position for viewing by persons sitting behind the container, e.g., by rear seat passengers. The armrest also telescopes via telescoping extensions 28 so that the screen can be elevated vertically higher than merely raising the armrest alone would elevate it. This allows passengers sitting in the rear seat to adjust the height of the display to a desired height. Armrest 12 can be mechanically locked in the upright position to prevent it from falling down while the screen is being viewed by rear seat passengers. The locking mechanism can be any one of many well known types of mechanical locking devices. The armrest or container body could be provided with a brace that engages the other of the armrest or container body to brace armrest 12 in its raised position to protect against damage from accidental application of force to armrest 12 while it is locked in its raised position.

As will now be apparent, the display can be viewed by persons seated in the front seat when the armrest is in its down position, and can be viewed by passengers seated in the rear seat when the armrest is in its raised position. Accordingly, a variety of devices can be operatively connected to the screen for display of information that will be useful or desirable for either the driver or for passengers in the front or rear seats. For example, as illustrated in FIG. 1 the video screen may be connected to an audiovisual playback entertainment device 40 for playing back audiovisual content from a pre-recorded medium, a navigational device 42 such as a GPS computer and/or map reader, and a wireless Internet connection device 44 so that a user may browse the Internet or read and send emails using the display. The display could be connected to virtually any other type of device which uses a display including digital messaging devices, game players, and even a general purpose computer which could be carried or mounted within the vehicle. A hardware or software switch could be used to select which of the devices will be operatively connected to and will control the display at any given moment. In this way the device can be quickly and conveniently switched between uses. For example, although the passengers in the rear seat may be viewing a video cassette with the armrest in the up position, the driver might need to momentarily view updated navigational information. To accommodate this the armrest can be moved to its downward position and the display quickly changed at the press of a button to display the navigational information needed by the driver. Once the driver has obtained the needed navigational information, the armrest can be restored to its raised position and the display switched back to displaying the video cassette.

In the mounting position shown in the embodiment shown in FIG. 2, the persons seated in the front seat must view the screen at least partially off to their sides rather than directly in front of them. Some persons sitting in the front seat may find it easier to read or view the display if the information on the display is rotated a quarter of a turn, e.g., approximately ninety degrees relative to the display frame, such that top-to-bottom orientation of the displayed information is oriented along a transverse axis of the vehicle. For this reason the display may be equipped with a control button or control switch and control electronics for rotating the displayed information approximately +90 degrees, 0 degrees, or 90 degrees, relative to the display frame or to the longitudinal axis of the vehicle. Although rotating the displayed information on the screen may be helpful to accommodate use by both rear seat passengers and front seat occupants, such rotation is not necessary.

Figure 6:
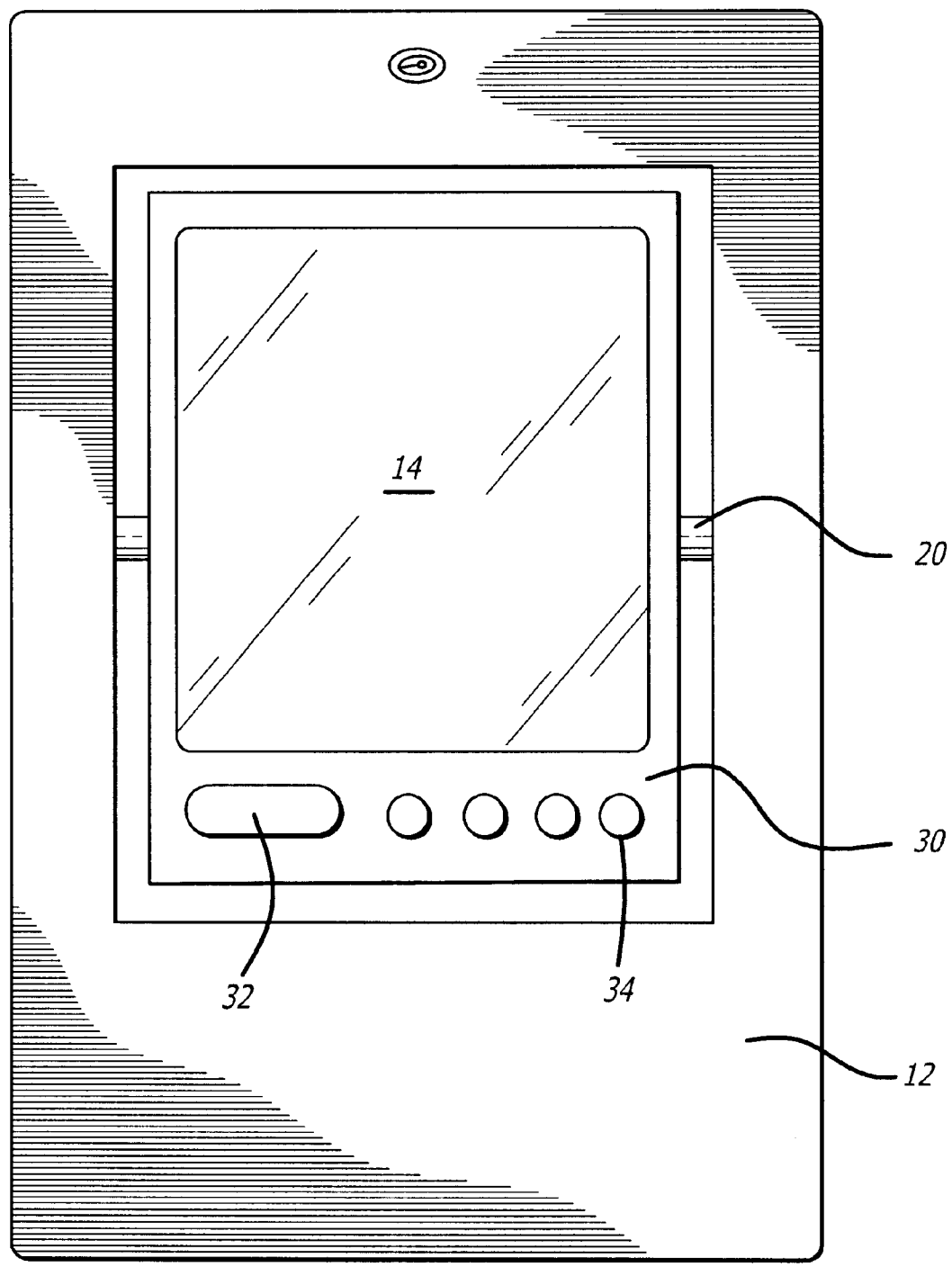
FIG. 6 is a close up view of the video screen mounted into a container lid/armrest.

FIG. 6 is a partial top view of the armrest 12 and display screen 14 inset therein, showing the display in greater detail. The display may include a display frame 30 having a number of display controls, including a remote control receiver 32 for receiving display command signals sent by a remote control transmitter, and/or a plurality of front panel controls 34 for controlling the display. The controls may include controls for adjusting the display characteristics such as brightness and contrast, for rotating the displayed information relative to the display frame, and for selecting between sources, for example between the output of a DVD player and the output from a navigational computer. Alternatively the display controls could be mounted on the body of armrest 12. Power video signals, and other signals may be supplied to the display either by a flexible wiring harness, a jack which plugs directly into the display, or through a slip ring arrangement.

The present invention may be used with nearly any device requiring or incorporating a display screen. As illustrative but non-exhaustive examples, the present invention could be used with a computer to function as a computer monitor. The display could be connected to a wireless Internet appliance, a browser-enabled computer, or a wireless telephone to provide mobile Internet access including email capability. The display could be connected to a video game processor to allow video games to be played on the display. The display could function as a digital pager or other messaging device. As electronics become more miniaturized, the display could contain general purpose or dedicated computers within the display frame itself, and could receive keyboard, joystick, mouse, track ball, or other inputs via the remote control receiver or through the wiring harness to accommodate an almost limitless number of display enabled devices in the future. All such present and future uses of a display screen, and combinations of uses, are contemplated as being within the scope and application of the present invention.

In another embodiment, the display is rigidly rather than rotatably mounted to the top surface of the pivoting armrest or container lid. In this embodiment the display can still be viewed by persons either in the front seat or the rear seat according to whether the armrest is in its raised or in its lowered position.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents. In the following claims, those claims which contain the words "means for" are intended to be interpreted in accordance with 35 U.S.C. §112, paragraph 6; those claims which do not include the words "means for" are intended to not be interpreted in accordance with 35 U.S.C. §112, paragraph 6.

What is claimed is:

1. A video display system for use in vehicles, comprising:
   a container for holding objects;
   a hinged lid mounted to the container for covering an opening of the container;
   a video display screen rotatably mounted within the lid such that the display screen can be rotated about an axis that is substantially parallel to a plane of the lid, the display screen being rotatable from a viewing position to a non-viewing position, the display screen being hidden from view when the lid is in a closed position and the display screen is rotated to its non-viewing position;
   a lock for holding the lid in an open position; and
   an extension for extending the display screen and a portion of the lid farther away from the container, such that the display screen may be raised and lowered for ease of viewing when the lid is in its open position.

2. The video display system of claim 1 wherein said lid is positioned adjacent and to the inside of a driver of the vehicle such that the driver can view the display screen when the lid is in its closed position and a passenger seated rearward of the driver can view the display screen when the lid is in its open position.

3. The video display system of claim 1 further comprising:
a control for rotating information displayed on the display screen such that a top-to-bottom orientation of the displayed information can be selected to be along either a longitudinal axis or a transverse axis of said lid.

4. The video display system of claim 3 wherein said control allows navigational information to be displayed in a transverse orientation for viewing by a person in a front seal of the vehicle, and for allowing video entertainment information to be displayed in a longitudinal orientation for viewing by a person in the back seat of the vehicle.

5. The video display system of claim 1 further comprising a video playback device (or reading an audiovisual work from a recorded medium and for sending video signals to the display screen.

6. The video display system of claim 1 further comprising a navigational computer for sending navigational information to the display screen.

7. The video display system of claim 1 wherein said extension is a telescoping extension.

8. The video display system of claim 1 wherein said display screen has a backside that visually blends with the lid such that when the display screen is rotated to its non-viewing position and the lid is closed the presence of the display screen is made more difficult to detect by potential thieves.

9. The video display system of claim 1 further comprising a security lock for preventing rotation of the display from its non-viewing position without a security key.

10. The video display system of claim 9 wherein said security lock comprises a key lock for locking the lid in its closed position.

11. The video display system of claim 10 wherein said key lock both locks and unlocks said lid, and prevents and allows rotation of the display from its non-viewing position to its viewing position.

12. The video display system of claim 9 wherein said security lock comprises a key lock for locking and unlocking said lid, and a manually operated release operable from an underside of the lid for allowing rotation of the display screen.

13. A display system for use in vehicles comprising:
a video display including a display screen mounted to a top surface of an armrest in a fixed relation thereto, the armrest capable of being positioned in either a substantially horizontal position or a raised position and capable of being locked in said raised position such that the display can be viewed when the armrest is in the raised position; and
a source of video signals operably connected to said display screen.

14. The display system of claim 13 wherein said armrest is an armrest for a driver of the vehicle and the armrest is positioned such that the display screen can he viewed by the driver when the armrest is in its substantially horizontal position, and the display screen can be viewed by a passenger in a rear scat of the vehicle when the armrest is in its raised position.

15. The display system of claim 13 further comprising video display controls mounted to said video display.

16. The display system of claim 13 further comprising video display controls mounted on said armrest.

17. The display system of claim 13 further comprising:
a remote control transmitter for transmitting control signals; and
a remote control receiver mounted to the video display for receiving said control signals and for controlling said video display ill response to said control signals.

18. A video display system comprising:
an armrest having a top surface; and
a video display screen having a viewing face and a backside, the display screen rotatably mounted to said top surface of said armrest such that when the armrest is in a substantially down position the video screen can be rotated a half turn about a substantially horizontal axis from a first and face-up position in which the viewing face is exposed, to a second and face-down position in which the viewing fate is not exposed when the armrest is in a down position thereby providing protection against damage to the viewing face and against theft when the display screen is not in use.

19. The video display system of claim 18 further comprising:
an audiovisual playback device for sending video information to the display screen.

20. Tho video display system of claim 18 further comprising:
a navigation device for sending navigation information to the display screen.

21. The video display system of claim 18 further comprising:
an audiovisual playback device for sending video information to the display screen and a navigation device for sending navigation information to the display screen.

22. A video display system including a video display screen mounted to the top surface of an armrest, the armrest being rotatable from a down position in which the video screen may be viewed by a person seated in a seat to which the armrest is associated, or a raised position in which the video screen may be viewed by a person disposed behind the seat to which the armrest is associated.

23. The video display system of claim 22 further comprising means for protecting the display screen when the display screen is not in use.

24. The video display system of claim 22 further comprising:
an extendible height adjustment for raising or lowering the display screen when the armrest is in its raised position.

25. The video display system of claim 23 wherein said means for protecting the display screen comprises a rotatable display screen mount for mounting the video screen within the armrest and alloying tile display screen to rotate about an axis that is substantially parallel to a plane of the arrest by at least approximately one half revolution, such that the display screen can rotate from a viewing position to a non-viewing and protected position without the display screen being substantially spatially displaced.

26. The video display system of claim 25 wherein said means for protecting the video screen further comprises a backside of said video screen, said backside being finished to have an appearance similar to a finish on said armrest, thereby making the existence of the video screen within a vehicle less apparent to observers when the video screen is rotated to its non-viewing position.

27. The video display system of claim 25 wherein said rotatable screen mount further includes a slip ring for supplying electrical power to said video screen.

28. The video display system of claim 24 wherein said means for protecting the screen comprises a display cover slidably mounted to said armrest.

29. The video display system of claim 23 wherein said armrest is also a cover to a lockable container, and wherein said means for protecting the video screen comprises a video screen cover, the video screen cover lockingly engaging at least one of the video screen and the cover.

30. The video display system of claim 29 further comprising:
 a security lock for locking said cover to said container; and
 a release operable from an underside of said cover to release said video screen cover.

31. A motorized vehicle equipped with a display, comprising a video display system according to claim 22 and a motorized vehicle, the video display system being mounted within said motorized vehicle such that the display can be viewed by either a front seat occupant or a rear seat occupant of the vehicle.

32. A video display screen mounted to a top surface of a container lid, the container lid being hinged at one end and suitable for mounting within a vehicle such that the video screen may be viewed by a first person disposed in a first location when the container lid is in a down position, and may be viewed by a second person disposed in a end location when the container lid is in a raised position rotated approximately 90 degrees upwardly from the down position.

33. A video screen rotatably mounted onto a top surface of a container cover or lid within a vehicle so as to rotate about the longitudinal or transverse axis of the vehicle without the screen being substantially spatially displaced by said rotation and lock in a selected rotational position such that the screen is provided a measure of protection against damage and theft when not in use.

34. A container for use within a vehicle, the container comprising:
 a container body;
 a lid for covering at least a portion of tie container body, the lid comprising:
  a lid body, the lid body having an aperture therein; and
  a video display disposed within said aperture and rotatably mounted to the lid body.

35. A vehicle display system comprising:
 an audiovisual playback device;
 a navigational computer;
 a display screen;
 a switch for selecting either the playback device or the navigational computer to he operatively connected to the display screen;
 switching circuitry (or allowing information displayed on the display screen to be rotated approximately plus 90 degrees, 0 degrees, and approximately minus 90 degrees relative to a longitudinal axis of a vehicle; and
 at least one pivotal member to allow the display to be positioned and oriented to he viewed by either a person in a more forward seat or a person in a more rearward seat.

36. A video display and mount for use in an automobile comprising:
 an after-market armrest compatible with a stock armrest mount within a vehicle; and
 a video display mounted to said after-market armrest;
 wherein said after-market armrest is adapted to be pivotally mounted such that when said after-market armrest is installed it can be pivoted so that the video display can be viewed by either a front seat occupant or a rear seat occupant.

37. An after-market container comprising:
 a container body, the container body suitable for mounting within a vehicle as a replacement for a stock container;
 a container cover attached to said container body; and
 a video display screen mounted within an aperture within said cover and rotatable at least approximately one-half turn about an axis that is substantially parallel to a top surface of said cover.

* * * * *